United States Patent
Sheng et al.

(10) Patent No.: US 8,395,827 B2
(45) Date of Patent: Mar. 12, 2013

(54) AUTOMATIC SHEET-FEEDING SCANNER HAVING NON-LINEAR PAPER PATH

(75) Inventors: Thomas Sheng, Hsinchu (TW); Chi-Yao Chen, Miaoli County (TW)

(73) Assignee: Avision Inc. (TW)

( * ) Notice: Subject to any disclaimer, the term of this patent is extended or adjusted under 35 U.S.C. 154(b) by 645 days.

(21) Appl. No.: 12/575,707

(22) Filed: Oct. 8, 2009

(65) Prior Publication Data

US 2010/0118356 A1    May 13, 2010

(30) Foreign Application Priority Data

Nov. 11, 2008 (TW) ................. 97143452 A

(51) Int. Cl.
*H04N 1/04* (2006.01)
(52) U.S. Cl. ........ 358/498; 358/497; 358/474; 271/264; 271/3.14; 399/367
(58) Field of Classification Search .................. 358/498, 358/474, 497, 486; 271/303, 264, 3.14, 14.01, 271/10.09, 278; 399/367
See application file for complete search history.

(56) References Cited

U.S. PATENT DOCUMENTS

| | | | | |
|---|---|---|---|---|
| 5,534,989 | A * | 7/1996 | Rubscha et al. | 399/381 |
| 6,809,796 | B2 * | 10/2004 | Sugeta | 355/40 |
| 7,106,827 | B2 * | 9/2006 | Heuft et al. | 378/57 |
| 7,327,497 | B2 * | 2/2008 | Sugeta et al. | 358/461 |
| 7,352,495 | B2 * | 4/2008 | Sugeta | 358/474 |
| 7,380,787 | B2 * | 6/2008 | Fukumura | 271/264 |
| 7,385,735 | B2 * | 6/2008 | Makino et al. | 358/496 |
| 7,425,001 | B2 * | 9/2008 | Sano et al. | 271/242 |
| 7,667,879 | B2 * | 2/2010 | Makino et al. | 358/498 |
| 7,719,730 | B2 * | 5/2010 | Park et al. | 358/498 |
| 7,735,402 | B2 * | 6/2010 | Tsuji et al. | 83/166 |
| 7,762,543 | B2 * | 7/2010 | Matsushima | 271/3.14 |
| 7,969,623 | B2 * | 6/2011 | Kagami et al. | 358/498 |
| 8,064,109 | B2 * | 11/2011 | Misu | 358/496 |
| 8,072,655 | B2 * | 12/2011 | Park et al. | 358/474 |
| 2006/0158701 | A1 * | 7/2006 | Park et al. | 358/498 |
| 2008/0304116 | A1 * | 12/2008 | Lee | 358/498 |
| 2009/0316222 | A1 * | 12/2009 | Oshida et al. | 358/474 |

* cited by examiner

*Primary Examiner* — Negussie Worku

(57) ABSTRACT

A scanner includes a platen assembly, a sheet feeder and a scanning module. The platen assembly and the sheet feeder are combined together to form a non-linear paper path. The paper path has a scan region. The sheet feeder includes a feeding mechanism, a transporting mechanism and a discharging mechanism. The feeding mechanism feeds a document into the paper path. The transporting mechanism transports the document from the feeding mechanism to the scan region. The document is transported past the scan region in a direction substantially parallel to a scan plane in the scan region. The discharging mechanism transports the document out of the paper path from the scan region. The scanning module movably disposed in the platen assembly acquires an image of the document transported past the scan region.

17 Claims, 3 Drawing Sheets

AUTOMATIC SHEET-FEEDING SCANNER HAVING NON-LINEAR PAPER PATH

This application claims priority of No. 097143452 filed in Taiwan R.O.C. on Nov. 11, 2008 under 35 USC 119, the entire content of which is hereby incorporated by reference.

BACKGROUND OF THE INVENTION

1. Field of the Invention

The invention relates to an automatic sheet-feeding scanner, and more particularly to an automatic sheet-feeding scanner having a feeding mechanism for transporting a document horizontally past a scan region of the scanner.

2. Related Art

For an automatic sheet feeder used in a conventional document scanner, rollers for transporting an original to and from the scan region are disposed on two sides of a scan region at a height higher than that of a scan platen in the scanner. The original is firstly transported by the rollers disposed on the upstream side of the scan region and then by the rollers disposed on the downstream side of the scan region.

FIG. 3 is a schematic illustration showing a conventional document scanner. Referring to FIG. 3, the document scanner includes an automatic sheet feeder 300 and a flatbed scanner 400. The flatbed scanner 400 includes a housing 410, a transparent platen 420, a scanning module 430 and a guide rod 440. The scanning module 430 may slide along the guide rod 440 to acquire an image of a stationary document placed on the transparent platen 420. In addition, the scanning module 430 may also acquire an image of the document D transported past a scan region 350.

The automatic sheet feeder 300 has a document supply tray 310, a document discharge tray 320 and a sheet-feeding mechanism 330. The sheet-feeding mechanism 330 includes a feeding roller 331 and three pairs of transporting rollers 332, 333 and 334. The feeding roller 331 feeds the sheets from the document supply tray 310 into a path 340 one by one. Then, the transporting rollers 332 transport the document D to and past the scan region 350. Next, the feeding rollers 333 and 334 transport the document D out of the paper path 340 to reach the document discharge tray 320. At the moment that the trailing edge of the document D leaves the feeding rollers 332 and drops off, a shock is applied to the document D, changing the distance between the document D and the scanning module 430 and affecting the quality of the scan image of the document D. Particularly when the photo image sensor used in the scanning module 430 is a contact-type image sensor (CIS), the influence of the shock to the scan image becomes evident because the CIS has a shorter depth of field. In such circumstance, the scan image is often blurred or defocused.

Thus, it is an important object of the invention to provide an automatic sheet-feeding scanner effectively eliminating the instantaneous shock to the scan image at the moment the original leaves the rollers.

SUMMARY OF THE INVENTION

It is therefore an object of the invention to provide an automatic sheet-feeding scanner having a transporting mechanism for transporting a document horizontally past a scan region of the scanner to eliminate the instantaneous shock to the scan image.

To achieve the above-identified object, the invention provides an automatic sheet-feeding scanner including a platen assembly, a sheet feeder and a scanning module. The sheet feeder is connected to the platen assembly. The platen assembly, including a scan platen, supports a document. The platen assembly and the sheet feeder are combined together to form a non-linear paper path. The paper path has a scan region. The sheet feeder includes a feeding mechanism, a transporting mechanism and a discharging mechanism. The feeding mechanism feeds the document into the paper path. The transporting mechanism transports the document from the feeding mechanism to the scan region. The document is transported past the scan region in a direction substantially parallel to a scan plane of the scan platen in the scan region. The discharging mechanism transports the document out of the paper path from the scan region. The scanning module, movably disposed in the platen assembly, acquires an image of the document being transported past the scan region.

Thus, the problem of shock to the scan image caused when the document leaves the transporting mechanism can be effectively solved.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
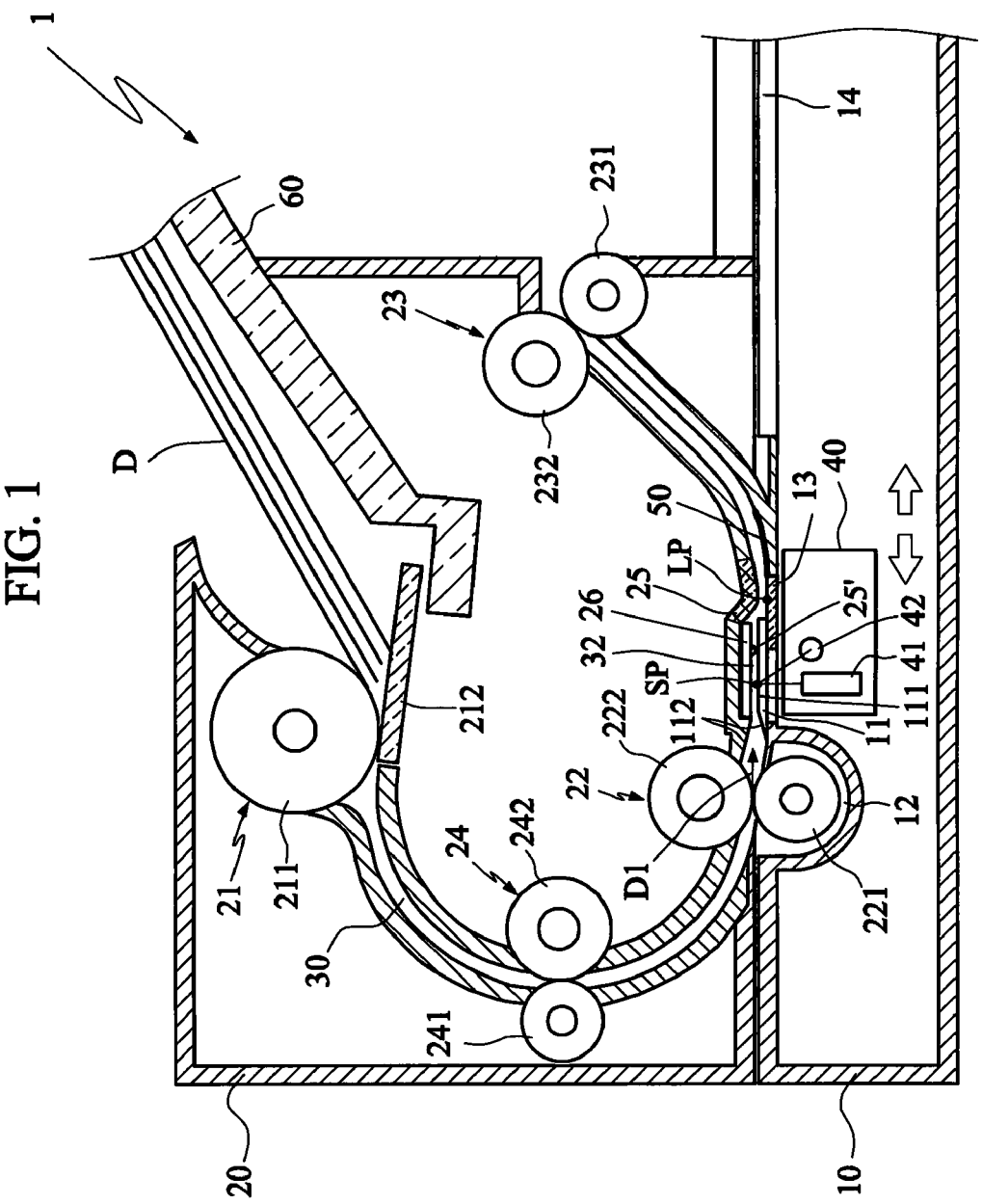
FIG. 1 is a schematic illustration showing an automatic sheet-feeding scanner according to a first embodiment of the invention.

FIG. 1 is a schematic illustration showing an automatic sheet-feeding scanner 1 according to a first embodiment of the invention. Referring to FIG. 1, the scanner 1 of this embodiment includes a platen assembly 10, a sheet feeder 20 and a scanning module 40.

The platen assembly 10 may be configured similar to the typical flatbed scanner. The platen assembly 10 has a platen 14 for supporting a document placed thereon, such that a flatbed scan operation may be performed.

The sheet feeder 20 is connected to the platen assembly 10 and placed on the platen assembly 10. The sheet feeder 20 and the platen assembly 10 may be opened or closed relatively to each other. In the closed state, the platen assembly 10 and the sheet feeder 20 are combined together to form a non-linear paper path 30. The platen assembly 10 also includes a scan platen 11 for supporting a document D transported by the sheet feeder 20, and the scanning module 40 positioned underneath the scan platen 11 acquires an image of the document D.

The paper path 30 has a scan region 32. The sheet feeder 20 includes a feeding mechanism 21, a transporting mechanism 22 and a discharging mechanism 23.

The feeding mechanism 21 feeds the document D into the paper path 30. The feeding mechanism 21 includes a feeding roller 211 and a frictional member 212, such as a friction pad. The feeding roller 211 and the frictional member 212 for separating the document D from another sheet and feeding the document D into the paper path 30 one by one are disposed opposite each other.

The transporting mechanism 22 may include two rollers 221 and 222 for transporting the document D from the feeding mechanism 21 to the scan region 32. The document D is transported past the scan region 32 in a direction D1 parallel to a scan plane 111 of the scan platen 11 in the scan region 32. In this embodiment, the document D is transported in a tangential direction of a nipping point between the rollers 221 and 222. The rollers 221 and 222 are disposed opposite each other and upstream of the scan region 32 and nip the document D when in active.

The discharging mechanism 23 may include two rollers 231 and 232 for transporting the document D out of the paper path 30 from the scan region 32. In this embodiment, a horizontal level of the feeding mechanism 21 is higher than a horizontal level of the transporting mechanism 22, and a horizontal level of the discharging mechanism 23 is higher than a horizontal level of the transporting mechanism 22. In addition, in order to transport the document D with the document D sliding on the scan plane 111 of the scan platen 11 in the scan region 32, the roller 221 of the transporting mechanism 22 is mounted in a receptacle 12 of the platen assembly 10 and to a shaft lower than the scan platen 11.

The scanning module 40, movably disposed in the platen assembly 10, acquires the image of the document D transported past the scan region 32 or of a document placed on the platen 14.

In order to smoothly transport the document D, the sheet feeder 20 may further include a second transporting mechanism 24, disposed upstream of the transporting mechanism 22, for transporting the document D from the feeding mechanism 21 to the transporting mechanism 22. That is, the second transporting mechanism 24 is disposed between the feeding mechanism 21 and the transporting mechanism 22. The second transporting mechanism 24 includes rollers 241 and 242.

When the scanning module 40 includes a light source 42 and a contact image sensor (CIS) 41, the sheet feeder 20 may further include a pressing member 25 in order to ensure that the document D at the scan position SP slides along the scan plane 111 of the scan platen 11. The pressing member 25, disposed downstream of the scan region 32, presses the document D transported past the scan region 32 such that the document D may be in direct contact with the scan plane 111. In this case, the platen assembly 10 may further include a sector 13 disposed downstream of the scan region 32 and opposite the pressing member 25. The sector 13 is juxtaposed to the scan plane 111 and has a low point LP lower than the scan plane 111. Because the low point LP is lower than the scan plane 111, the pressing member 25 may press the document D located in this sector 13 down to a position lower than the scan plane 111. Consequently, the document D in the scan region 32 may smoothly slide on the scan platen 11.

Thus, the document D is transported in the paper path 30 to the discharging mechanism 23 sequentially past the transporting mechanism 22, the scan region 32 and the pressing member 25.

In addition, the automatic sheet-feeding scanner 1 may further include a guide member 50 and an inclined surface 112. The guide member 50, disposed in the paper path 30 and downstream of the scan region 32, guides the document D to the discharging mechanism 23. The inclined surface 112 abuts the scan plane 111, where the document D is transported to the scan plane 111 along the inclined surface 112. The inclined surface 112 may be a ramp formed at the front end of the scan platen 11 or may be formed by two sidewall surfaces of the paper path 30.

In this case, the document D is transported in the paper path 30 to the discharging mechanism 23 sequentially past the transporting mechanism 22, the scan region 32 and the guide member 50.

The sheet feeder 20 may further include a background color plate 26, disposed opposite the scan plane 111, for providing reference for scanner calibration or for providing background for the document D. The scanning module 40 may be moved to scan a plurality of lines on the background color plate 26, so that the standard white/black or color shading correction may be executed. In addition to the pressing member 25, the sheet feeder 20 may further include another pressing member 25', disposed opposite the scan platen 11, for pressing the document D in the scan region 32, so that the document D may slide along the scan plane 111.

Figure 2:
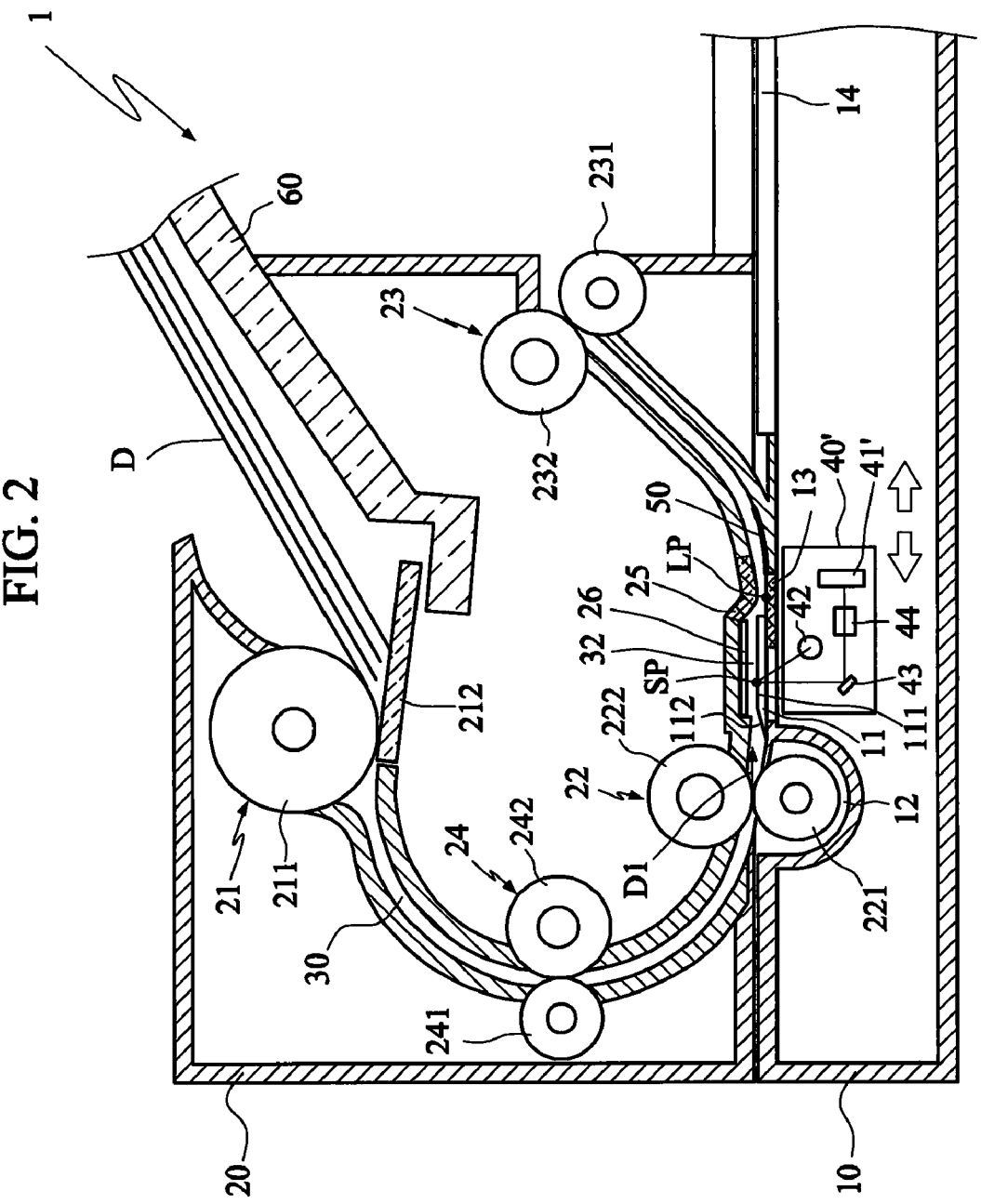
FIG. 2 is a schematic illustration showing an automatic sheet-feeding scanner according to a second embodiment of the invention.
Figure 3:
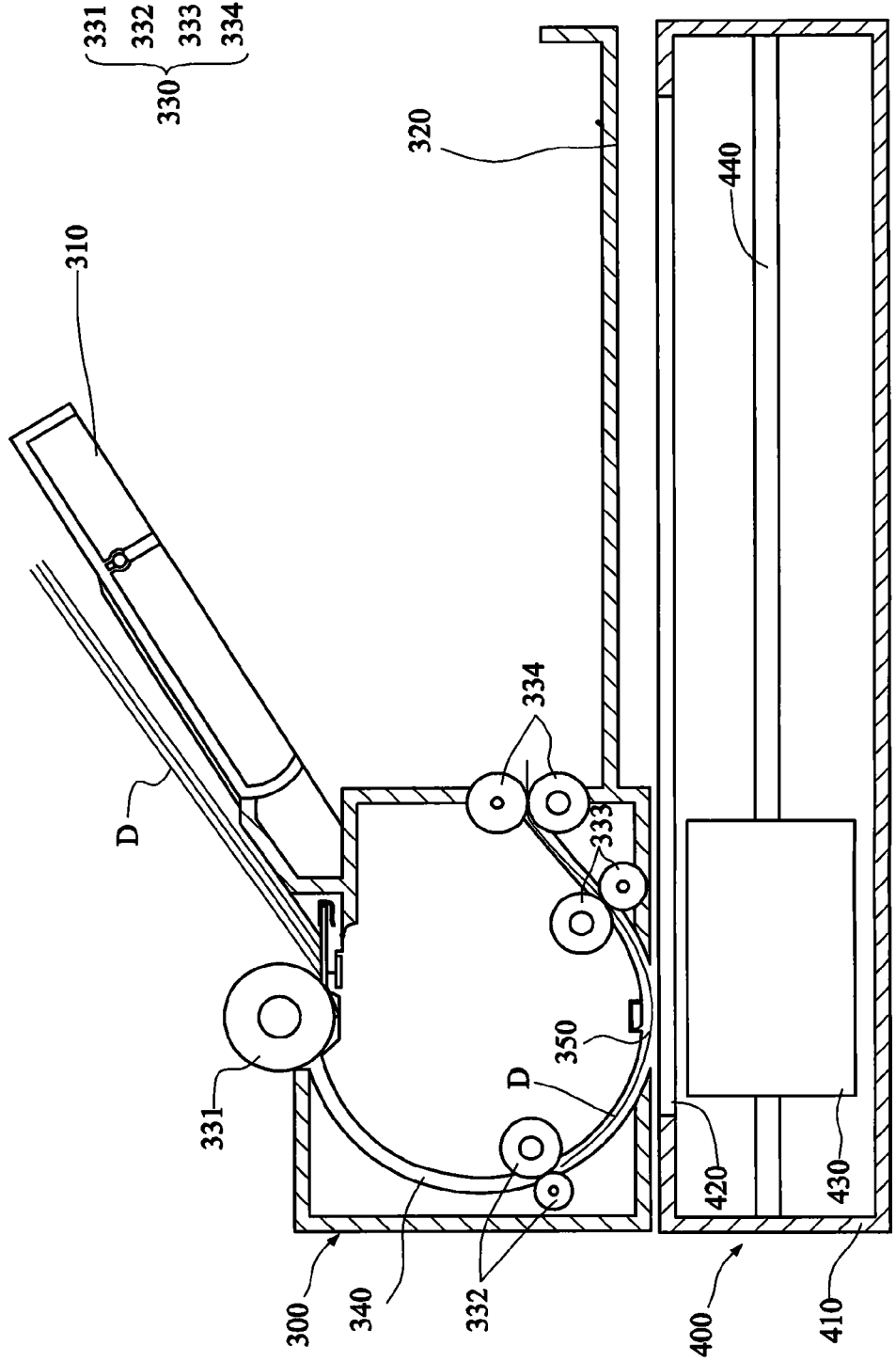
FIG. 3 is a schematic illustration showing a conventional document scanner.

FIG. 2 is a schematic illustration showing a document scanner according to a second embodiment of the invention. As shown in FIG. 2, the automatic sheet-feeding scanner 1 of this embodiment is similar to that of the first embodiment except that a scanning module 40' of the automatic sheet-feeding scanner 1 includes a charge coupled device (CCD) image sensor 41', a light source 42, a reflecting mirror 43 and a lens 44.

According to the embodiments of the invention, the two rollers 221 and 222 of the transporting mechanism 22 nip the document D at the nipping point, and the nipping point and the scan plane 111 are located on the same horizontal plane. The pressing member 25 disposed downstream of the scan platen 11 makes the original slide along the scan plane 111 and past the scan region 32 without being affected by image shock generated in the prior art.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. An automatic sheet-feeding scanner, comprising:
   a platen assembly, comprising a scan platen, for supporting a document;
   a sheet feeder, wherein the platen assembly and the sheet feeder are combined together to form a non-linear paper path, which has a scan region, and the sheet feeder comprises:
   a feeding mechanism for feeding the document into the paper path;
   a transporting mechanism for transporting the document from the feeding mechanism to the scan region, wherein the transporting mechanism comprises two rollers, disposed opposite each other and upstream of the scan region and one of the two rollers of the transporting mechanism is mounted in a receptacle of the platen assembly, the document is transported in a tangential direction of a nipping point between the rollers, and the tangential direction of the nipping point between the rollers is substantially parallel to a scan plane of the scan platen in the scan region; and a discharging mechanism for transporting the document out of the paper path from the scan region; and a scanning module, movably disposed in the platen assembly, for acquiring an image of the document being transported past the scan region.

2. The scanner according to claim 1, wherein a horizontal level of the feeding mechanism is higher than a horizontal level of the transporting mechanism.

3. The scanner according to claim 1, wherein a horizontal level of the discharging mechanism is higher than a horizontal level of the transporting mechanism.

4. The scanner according to claim 1, wherein the sheet feeder further comprises:

a second transporting mechanism, disposed upstream of the transporting mechanism, for transporting the document from the feeding mechanism to the transporting mechanism.

5. The scanner according to claim 1, wherein the feeding mechanism comprises a feeding roller and a frictional member, disposed opposite each other, for separating the document from another sheet and feeding the document.

6. The scanner according to claim 1, wherein the discharging mechanism comprises two rollers, disposed opposite each other and downstream of the scan region.

7. The scanner according to claim 1, wherein the sheet feeder further comprises:

a pressing member, disposed downstream of the scan region, for pressing the document transported past the scan region to make the document directly contact the scan plane.

8. The scanner according to claim 7, wherein the platen assembly further comprises:

a sector, disposed downstream of the scan region and opposite the pressing member, the sector having a low point lower than the scan plane.

9. The scanner according to claim 8, wherein the sector is juxtaposed to the scan plane.

10. The scanner according to claim 7, wherein the document is transported in the paper path to the discharging mechanism sequentially past the transporting mechanism, the scan region and the pressing member.

11. The scanner according to claim 7, wherein the scanning module comprises a contact image sensor (CIS).

12. The scanner according to claim 1, further comprising a guide member, disposed in the paper path and downstream of the scan region, for guiding the document to the discharging mechanism.

13. The scanner according to claim 12, wherein the document is transported in the paper path to the discharging mechanism sequentially past the transporting mechanism, the scan region and the guide member.

14. The scanner according to claim 1, further comprising an inclined surface abutting the scan plane, wherein the document is transported to the scan plane along the inclined surface.

15. The scanner according to claim 1, wherein the sheet feeder further comprises a background color plate disposed opposite the scan plane.

16. The scanner according to claim 1, wherein the sheet feeder further comprises a pressing member disposed opposite the scan plane.

17. The scanner according to claim 1, wherein the scanning module comprises a charge coupled device (CCD) image sensor.

* * * * *